No. 659,660. Patented Oct. 16, 1900.
M. GEHRE.
APPARATUS FOR PERIODICAL GENERATION OF ELECTRIC CURRENTS BY MOTORS OF IRREGULAR DRIVING POWER.
(Application filed Dec. 19, 1899.)
(No Model.) 2 Sheets—Sheet 1.
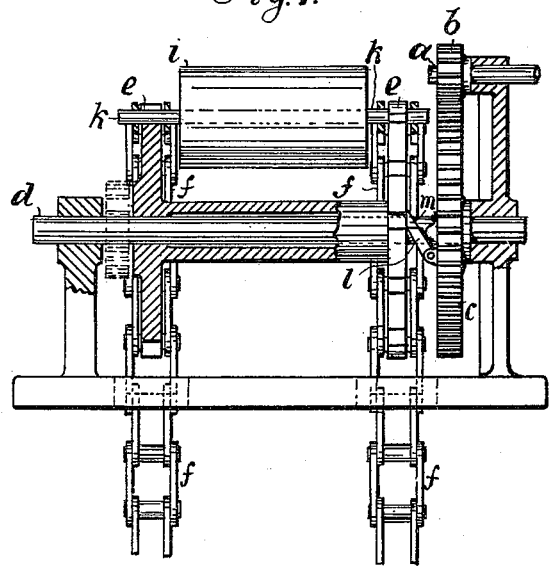
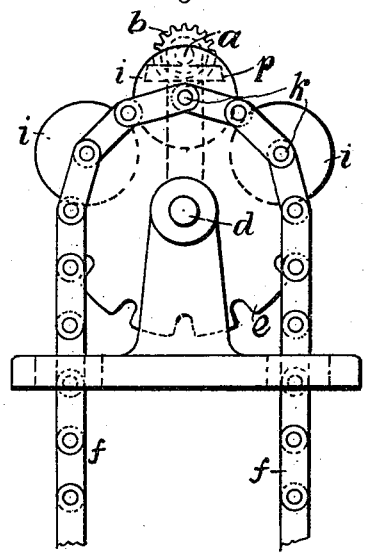
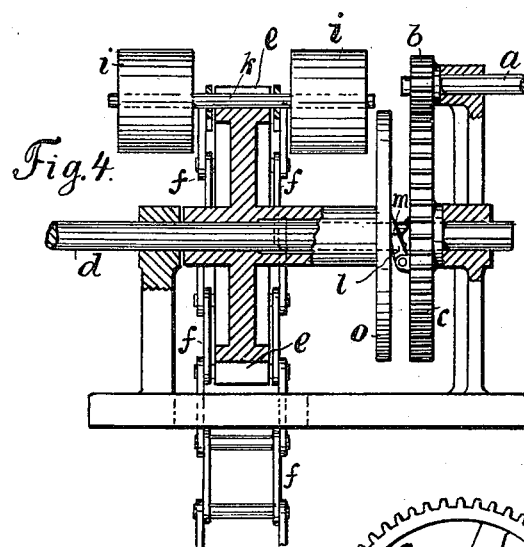
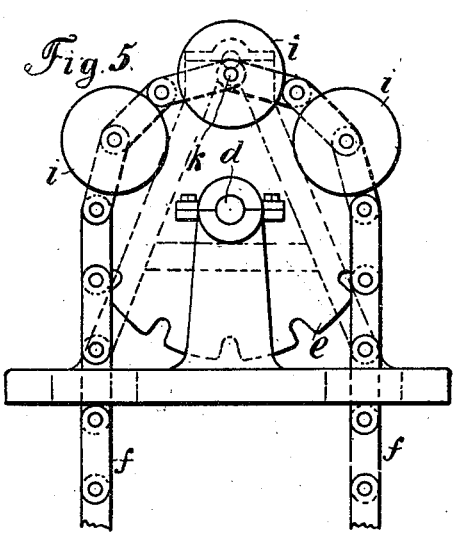
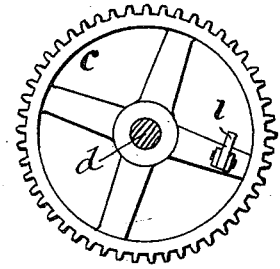
WITNESSES:
Fred White
Thomas F. Wallace
INVENTOR:
Max Gehre,
By his Attorneys
Arthur C. Fraser & Co.

No. 659,660. Patented Oct. 16, 1900.
M. GEHRE.
APPARATUS FOR PERIODICAL GENERATION OF ELECTRIC CURRENTS BY MOTORS OF IRREGULAR DRIVING POWER.
(Application filed Dec. 19, 1899.)
(No Model.) 2 Sheets—Sheet 2.
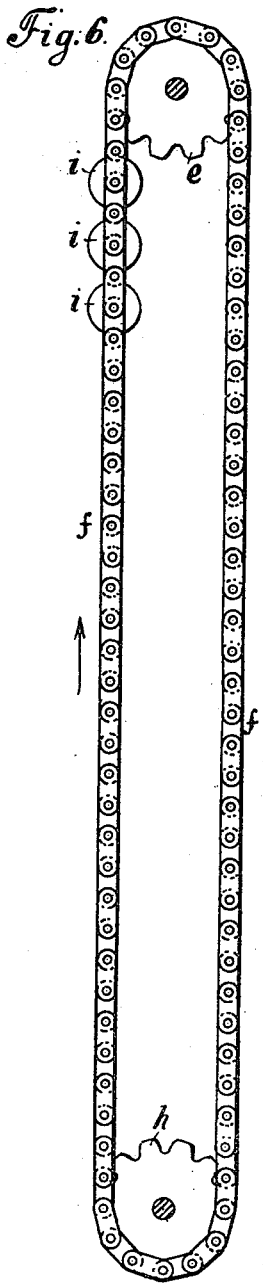
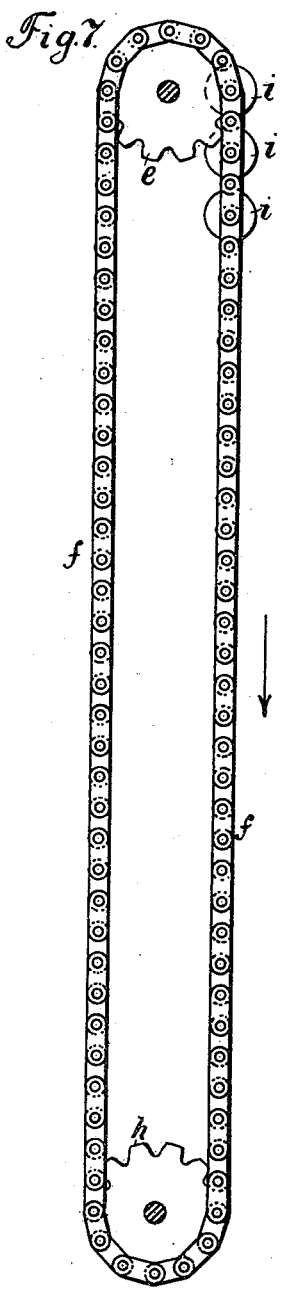
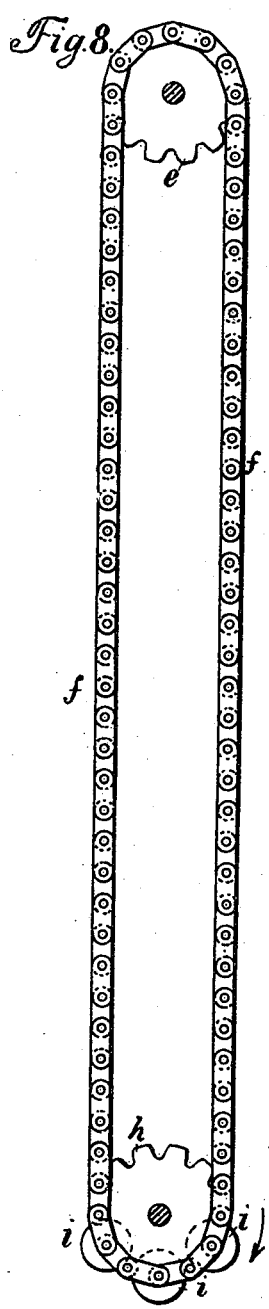
WITNESSES:
Fred White
Thomas F. Wallace
INVENTOR:
Max Gehre,
By his Attorneys:
Arthur C. Fraser & Co.
THE NORRIS PETERS CO., PHOTO-LITHO., WASHINGTON, D. C.

UNITED STATES PATENT OFFICE.

MAX GEHRE, OF RATH, GERMANY.

APPARATUS FOR PERIODICAL GENERATION OF ELECTRIC CURRENTS BY MOTORS OF IRREGULAR DRIVING POWER.

SPECIFICATION forming part of Letters Patent No. 659,660, dated October 16, 1900.

Application filed December 19, 1899. Serial No. 740,877. (No model.)

*To all whom it may concern:*

Be it known that I, MAX GEHRE, a subject of the Emperor of Germany, residing at Rath, near Dusseldorf, Germany, have invented certain new and useful Improvements in Apparatus for the Periodical Generation of an Electric Current by Motors of Irregular Driving Power, of which the following is a specification.

This invention relates to the utilization of motors operated by irregular driving power and aims to provide improved means for periodically utilizing the power generated by such motors for any purpose—such, for example, as for the generation of an electric current.

Various powers which act periodically with more or less force—as, for example, the wind—are not well adapted for many industrial purposes, especially in cases where it is essential that a certain maximum velocity be not exceeded. This applies in certain cases to the generation of electrical currents—for instance, the currents for the charging of accumulators—because if a certain maximum velocity is exceeded disturbances in the circuits of the dynamo may be apprehended.

The present invention aims to provide means whereby motors with irregular driving power can be utilized to periodically drive with uniform force or a certain maximum velocity other devices.

To this end in carrying out the preferred form of my present invention the improved apparatus comprises a chain-pulley or chain-pulleys; an endless chain or chains carrying weights and acting on the pulley or pulleys; means for driving the chain pulley or pulleys from the motor by means of a separable connection, as a ratchet and pawl or a dog and nosepiece, until the weights are carried over the pulleys and start to fall downward; means whereby during such downward movement the pawl or dog remains out of engagement, or vice versa, and means whereby the pawl or dog becomes again operative for again raising the weight at a predetermined time.

In the accompanying drawings, which show certain adaptations of my improvements, Figure 1 is a fragmentary elevation, partly in vertical axial section, showing the preferred form of my improved apparatus. Fig. 2 is a fragmentary side elevation thereof. Fig. 3 is a side view of one of the spur-wheels forming part of the driving mechanism and provided with a catch or stop. Fig. 4 is a fragmentary view similar to Fig. 1, but showing a single chain-pulley. Fig. 5 is a fragmentary side elevation thereof; and Figs. 6, 7, and 8 are fragmentary views on a smaller scale, showing the different positions of the chains and also the lower pulley over which the chains pass.

Referring to Figs. 1 to 3 of the drawings, $a$ represents a shaft which is driven by a motor of variable driving power, (which motor is not shown,) such as a windmill, for example. $b$ is a pinion on this shaft.

$c$ is a large spur gear-wheel meshing with and driven by the pinion $b$.

$d$ is a shaft on which the spur-wheel $c$ is loosely mounted. $e\ e$ are the pulleys, rigidly mounted on the shaft $d$ and connected together by an elongated hub.

$f\ f$ are endless chains running over the pulleys $e$.

$h$ represents lower chain-pulleys around which the lower parts of the chains pass. (See Figs. 6 and 7.)

$i$ represents weights carried by the chains and arranged closely together between them.

$k$ represents jointing-rods passing through the weights and connecting them and the two chains together.

$l$ is a catch or pawl carried by the spur-wheel $c$, and $m$ is a ratchet, nose, or stop carried by one of the chain-pulleys.

For the purpose of generating a current the shaft $d$ is designed to be periodically rotated at a uniform velocity by the effect of the weights $i$ each time that such weights are passed over the upper pulleys $e$. The shaft $a$ is the motor-driven shaft and drives the gear-wheel $c$. The chain-wheels, chains, and weights constitute a power-storing device. The pawl $l$ and nose $m$ serve as a separable driving connection between the motor-driven shaft and the power-storing device, and the shaft $d$ constitutes the power-driven shaft.

In operation the shaft $a$ through pinion $b$ drives wheel $c$, which revolves freely on the shaft $d$ until the catch $l$ engages the nose $m$ upon the adjacent chain-pulley, whereupon the chain-pulleys are caused to revolve with the wheel c. This motion is continued until the weights i are raised, as shown by the arrow in Fig. 6, until they pass over the top of the upper chain-pulleys, whereupon they will descend under the impulse of gravity, and in doing so will continue to rotate the chain-pulley, and with it the shaft d, to which it is connected, with a uniform force and velocity. The weights are shown descending in Fig. 7. When the weights reach the lower chain-pulleys h and arrive at an equilibrium, as shown in Fig. 8, they will cease to drive the chain-pulleys e, and the chains and pulleys will remain idle until the pawl l again engages the nose m, whereupon the weights will again be raised by the spur-wheel c until they again pass over the upper pulleys e and are free to again descend. With the falling of the weights the chain-pulleys will rotate faster than the spur-wheel c, thus moving the nose m away from engagement with the catch l; but after the weights have descended and reached an equilibrium the pulleys e will remain stationary, so that the catch l may come in contact with the nose m for again lifting the weights when the spur-wheel c has rotated far enough to bring the catch to the new position of the nose. In this way a periodical uniform rotation of the shaft d is obtained by the effect of the weights, so that this shaft may be used as the driving-shaft of an electrical generator or of any other device requiring periodical driving at uniform speed.

The wheel c could be keyed upon the shaft d; but in that case the pulleys e should be loosely mounted upon the shaft. The pulleys could not in that case be used for the generation of a current, but a special connection with the chain-pulleys would then be required for the rotation of the shaft designed to generate the current. This may be readily done, as shown in dotted lines in Fig. 1, by arranging at the side of one of the chain-pulleys e a wheel n, transmitting the rotation to another gear-wheel mounted upon the shaft. (Not shown.)

In the construction shown in Figs. 4 and 5 a single chain-pulley is fixed on the shaft d. The joint-pins k are extended in both directions from the chain f in this case, so as to carry a weight i at each side of the pulley. Opposite the dog l, carried by the wheel c, is arranged a disk o, on which the nose m is provided, said disk o being formed integrally with the hub of the chain-pulley e or fixed thereto. The rest of the construction is the same as that described with reference to Figs. 1 and 2 and bears the same letters of reference. In this construction the endless chain f is also passed around a lower pulley h, as shown in Figs. 6 and 8. The lower pulleys h, while preferable, may of course be eliminated; but in such case it will be desirable to provide suitable guiding devices for the chain—as, for example, the guide p—above the upper pulleys e in order to prevent the chain from becoming displaced.

Obviously it is immaterial which of the parts carries the catch and which the nose, as any suitable arrangement of parts for effecting a separable connection between the motor-driven shaft and the power-storing device may be employed without departing from the spirit of the invention.

What I claim is—

1. A device for generating an electrical current or for other purposes by means of motors of variable driving power, comprising a motor-driven part, in combination with a power-storing device consisting of a chain-pulley, a chain having a weighted portion passing over said pulley, a separable driving connection between said motor-driven part and said pulley for transmitting the motion of said part to said pulley for lifting the weight, and for disconnecting said parts, to permit the weight to descend, and a shaft driven by said pulley during the descent of the weight.

2. In a device for generating an electrical current or for other purposes, the combination with a motor-driven part having a variable driving power, of a chain-pulley, a chain passing over the pulley, a weight fixed to the chain, a separable driving connection between said part and said pulley consisting of a catch on one of said parts, and a nose engaged by the catch on the other of said parts for driving the pulley to raise said weight, and releasing the pulley to permit falling of said weight, and a shaft driven by said pulley during the descent of said weight.

3. In a device for generating an electrical current, the combination with a motor-driven shaft of variable driving power, and the shaft of an electric generator, of a chain-pulley, a chain passing over said pulley, a weight fixed to said chain, and separable mechanism between said motor-driven shaft and said pulley for driving the pulley from the motor-driven shaft to raise said weight, and releasing the pulley from the motor-driven shaft to permit the falling of said weight, and a connection between the pulley and said generator-shaft driving the latter during the falling of the weight.

In witness whereof I have hereunto signed my name in the presence of two subscribing witnesses.

MAX GEHRE.

Witnesses:
 WOLDEMAR HAUPT,
 HENRY HASPER.